United States Patent Office 3,316,554
Patented Apr. 25, 1967

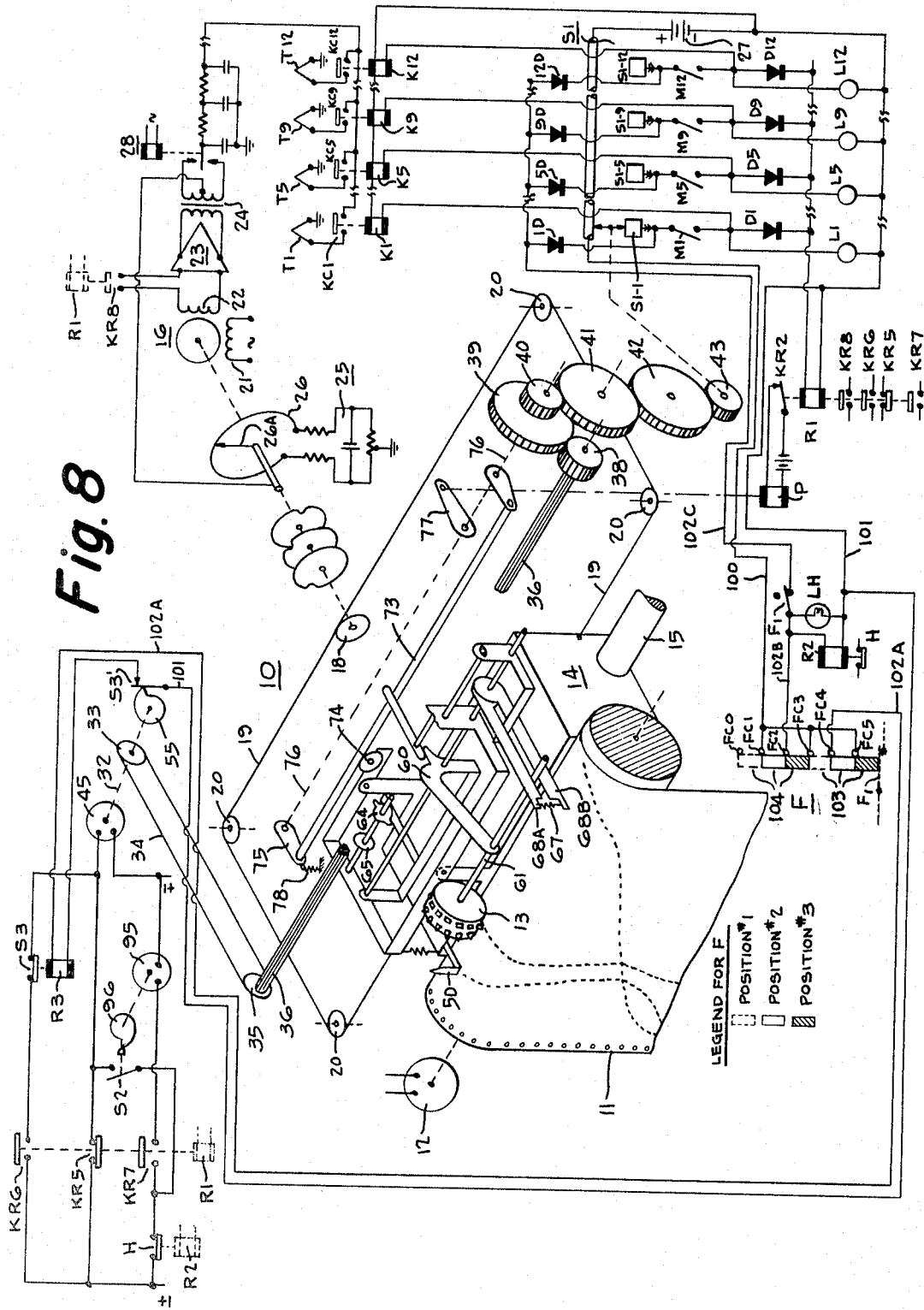

3,316,554
MULTI-POINT RECORDERS
Kenneth B. Parker, Jr., Norristown, and Albert E. Paschkis, Gwynedd Valley, Pa., assignors to Leeds and Northrup Company, Philadelphia, Pa., a corporation of Pennsylvania
Filed Oct. 7, 1964, Ser. No. 402,215
22 Claims. (Cl. 346—34)

This invention relates to multi-point recorders for recording, as a function of time, the variations in magnitude of a variable, such as temperature, pressure, voltage or the like, at various measuring points of a system or process.

In accordance with one feature of the present invention, the point-printing mechanism of a multi-point recorder, in its usual cycle of scanning successive measuring points, is precluded from printing non-selected measuring points by an interconnected solenoid and relay arrangement in which the relay-energization circuit is controlled by point-selector switches respectively corresponding with the measured points and a multi-point scanning switch driven in synchronism with the point-printing mechanism.

In accordance with another and related feature of the present invention, the scanning-cycle time of the recorder is reduced by providing a fixed time interval for printing of any selected one or more measuring points and rapid advance of the scanning switch over any intervening non-selected measuring point or points. More particularly and in one embodiment, the motor-drive means for the print-mechanism comprises high-speed and slow-speed motors respectively coupled by overrunning clutches to the print-mechanism. The high-speed motor is deenergized via control relay means when the scanning switch is on a selected measuring point, the continuously-energized slow-speed motor then affording the fixed-time interval allocated for measuring and printing. In another embodiment, the drive for the print-mechanism has a single, high-speed motor which is stopped and re-started, when the scanning switch is on a selected point, under control of a timer and control-relay means. Preferably, the control circuitry for the motor-drive means includes a hold-switch operable to suspend advance of the scanning switch from a selected point position so to provide continuous monitoring of a selected measuring point or the paralleled outputs of transducers at any selected combination of selected measuring points.

In accordance with another and related feature of the present invention, transducers at the measuring points are respectively connected to the rebalanceable measuring circuit of the recorder by input relays. In some embodiments of the invention, the input relays are sequentially energized during each cycle of the scanning switch, but the aforesaid solenoid and relay arrangement permit printing of only the selected-point transducer outputs in sequence: in other embodiments of the invention, any input relay or combination of input relays becomes energized upon closure of the corresponding point-selector switch or switches and remains continuously energized for all positions of the scanning switch.

In a preferred embodiment of the invention, the recorder system additionally includes a function switch which together with the solenoid/control relay arrangement and a hold-switch relay affords for different positions of the function switch: (#1) printing of any selected measuring point or combination of measuring points in sequence; (#2) continuous monitoring, without printing, of any selected measuring point or any paralleled combination of measuring points; (#3) continuous monitoring, with printing, of any selected measuring point or any paralleled combination of measuring points. An auxiliary function switch may be provided to preclude cycling of the scanning switch for the #2 position of the function switch beyond the first-reached selected-point position of the scanning switch.

The invention further resides in multi-point recorder systems having novel and useful features of construction, combination and arrangement hereinafter described and claimed.

For a more detailed understanding of the invention, reference is made to the subsequent description of various embodiments thereof and to the accompanying drawings in which:

FIG. 1 schematically illustrates a recorder system including a multi-point recorder having a two-speed print drive and associated circuitry;

FIGS. 2 and 3 respectively illustrate normal and hold-out positions of the print wheel of FIG. 1 as controlled by a solenoid;

Figure 1:
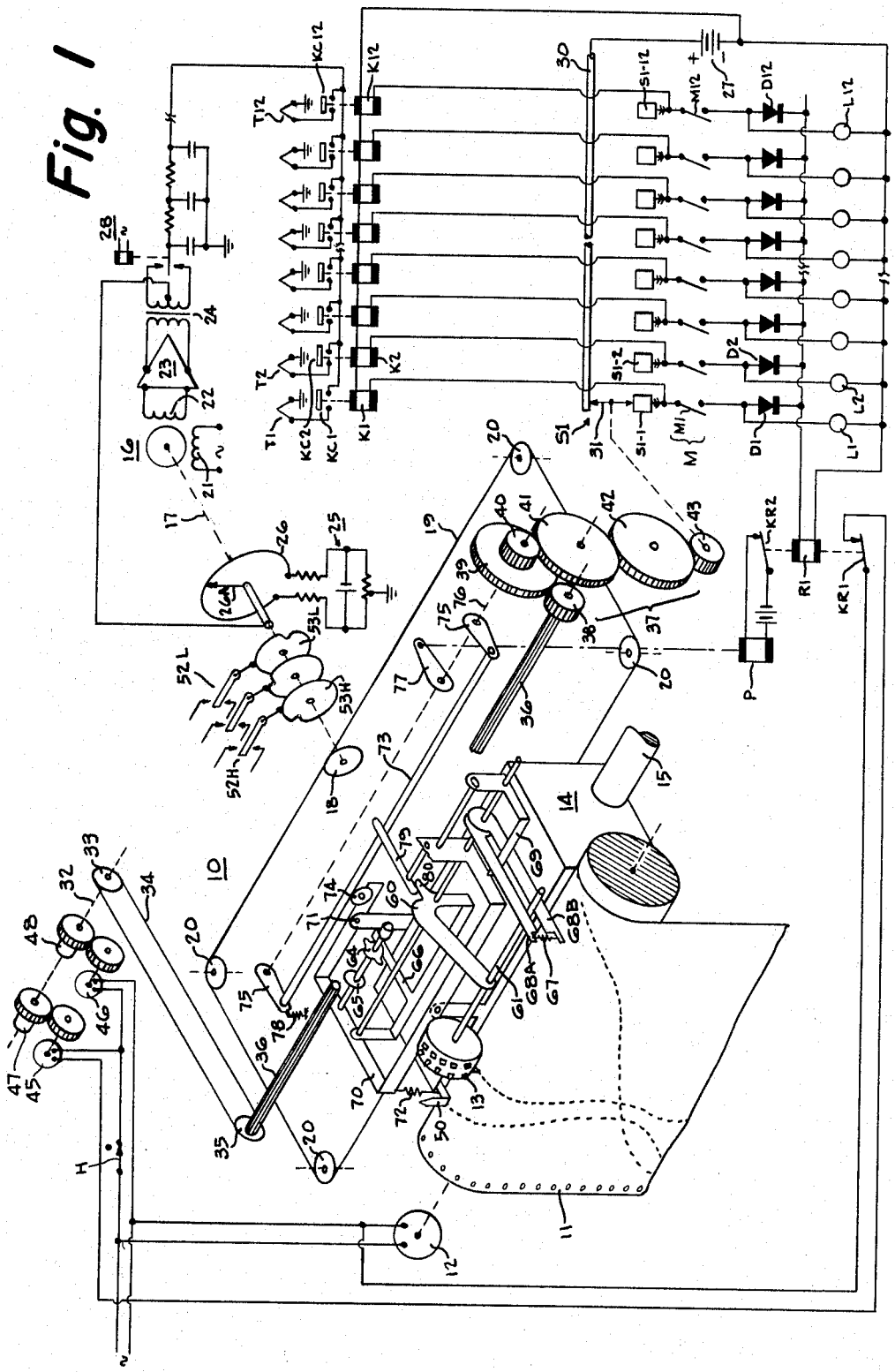
Figure 9:
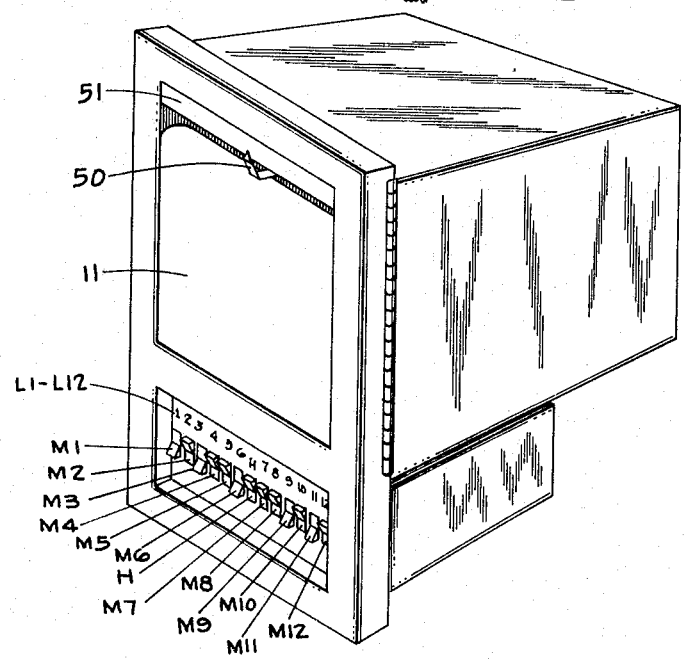
Figure 5:
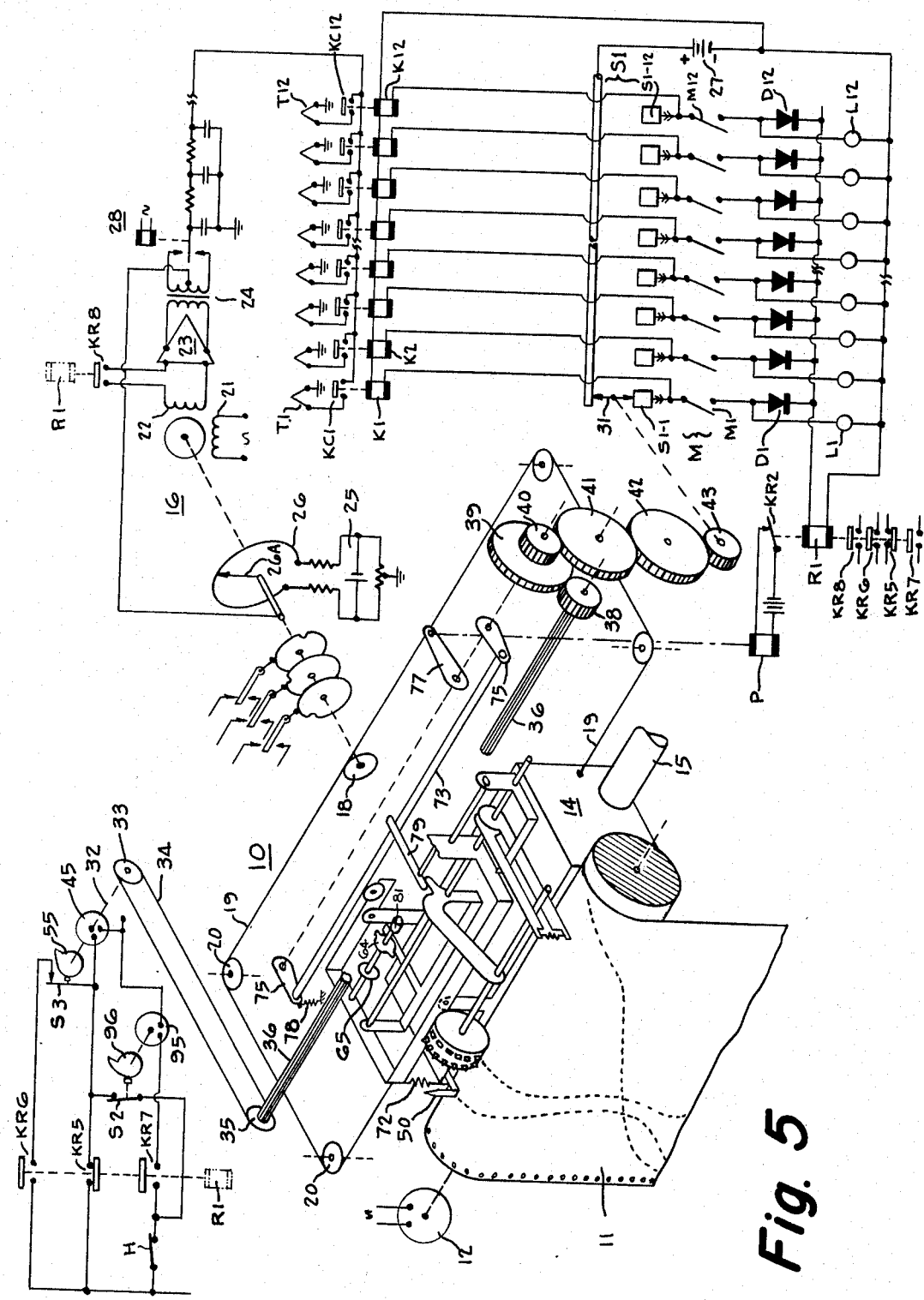
Figure 6:
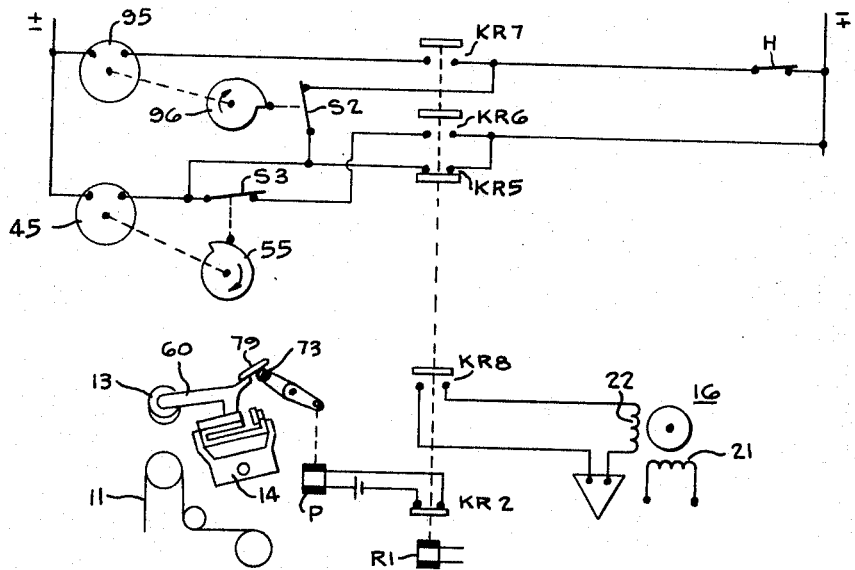
Figure 7:
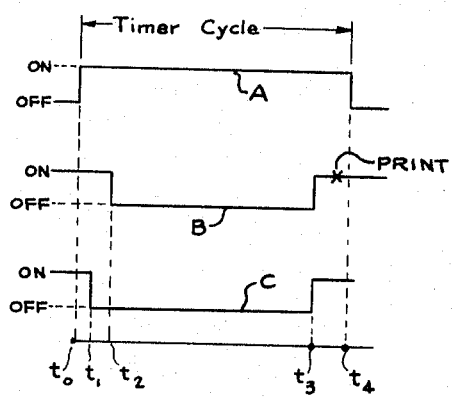

FIG. 5 schematically illustrates a second recorder system including a multi-point recorder having a single-speed, ON-OFF drive and associated circuitry including a timer;

FIG. 6 is a control-circuit diagram for components of FIGS. 5 and 8;

FIG. 7 is a timing diagram referred to in discussion of FIGS. 5 and 8;

FIG. 8 schematically illustrates a third recorder system providing modes of operation in addition to those of FIGS. 1 and 5; and FIG. 9 is a perspective view of a multi-point recorder and associated mode-selector panel.

Referring to FIG. 1 as exemplary of a recorder system embodying the present invention, the multi-point recorder 10 may be of the construction more fully described and claimed in copending applications Ser. Nos. 277,995 and 353,382 respectively filed May 6, 1963, and Mar. 20, 1964 and upon which have issued Letters Patent 3,195,141 and 3,295,140 respectively. The recorder chart 11 is continuously driven by chart motor 12 and is in the path of the print wheel 13, or equivalent printing element, which is pivotally mounted on the recorder carriage 14 for movement toward and from engagement with the chart. The carriage 14 is supported, as by guide 15, for movement across the chart 11 by the rebalancing motor 16. The drive between motor 16 and carriage 14 includes the shaft 17, drive pulley 18 and the drive cord 19 forming a loop around the idler pulleys 20.

The rebalancing motor 16 may be of the two-phase reversible type having one winding 21 continuously energized from a suitable A.C. source to serve as a phase-reference. The other winding 22 is a control winding energized by the output of the unbalance amplifier 23. The input to amplifier 23, as supplied via signal transformer 24, is an A.C. signal of magnitude corresponding with the difference between the output voltage of a selected one of the transducers T1 to T12 and the output voltage of the rebalanceable circuit 25. The phase of such A.C. input signal with respect to the phase-reference excitation of winding 21 depends upon the sense of such unbalance. The conversion of the unbalanced D.C. outputs to an A.C. signal may be effected by the synchronous chopper 28. Thus, during existence of an unbalance signal, the motor 16 rotates in direction corresponding with the sense of unbalance to move the contact 26A relative to slidewire 26 in direction to effect balance. Concurrently with rebalancing of the measuring circuit, the motor 16 changes the position of carriage 14 across chart 11 so that when rebalance is complete, the printing element 13 is in position representative of the magnitude of the measured variable and ready for printing of the then connected measuring point.

The inclusion of transducers T1 to T12 in the input circuit of amplifier 23 is effected by the input-selector relays K1 to K12 respectively. For example, when relay K1 is energized, its contact KC1 connects transducer T1 into the measuring circuit. The energization of relays K1 to K12 is controlled by the synchronizing switch S1 operated by the print-drive mechanism of recorder 10.

The synchronizing or scanning switch S1 may be a single-pole twelve-position switch comprising a fixed contact ring 30 in continuous engagement with a bridging contact 31 which successively engages the stationary contacts S1–1 to S1–12. The contact 31 of switch S1 is driven from the print-drive shaft 32 of recorder 10 via sprocket 33, chain 34, sprocket 35, elongated pinion 36, and the gear train 37 comprising gears 38–43. Assuming the manually-controlled Hold switch H is closed, the print-drive shaft 32 rotates either at high-speed or low-speed with corresponding change in speed of contact 31 of the synchronizing switch S1.

In the particular arrangement shown in FIG. 1, the two-speed drive of the synchronizing switch S1 is effected by the high and low-speed motors 45, 46 respectively coupled to shaft 32 by the over-running clutches 47, 48. So long as switch H is closed, the low-speed motor 46 is energized: so long as switch H and contacts KR1 of relay R1 are closed, the high-speed motor 45 is energized. In consequence, when relay R1 is in deenergized state, the shaft 32 is rotated at high speed for rapid advance of contact 31 of the synchronizing switch S1; and when relay R1 is in energized state, the shaft 32 is rotated at slow speed for slow-speed advance of contact 31 of the synchronizing switch.

The state of relay R1 also determines whether or not the print-drive mechanism is effective during the print-cycle time of the recorder to move the print wheel 13, or equivalent, into engagement with the chart 11. Specifically, so long as relay R1 is deenergized, its normally-closed contacts KR2 maintain energization of the print hold-out solenoid P so to prevent printing: so long as relay R1 is energized, the print hold-out solenoid P is deenergized and the print-drive is effective for printing of a measured point. A particular mechanism controlled by solenoid P to permit or to prevent printing is later herein described.

As will now be explained, the system of FIG. 1 provides: (a) for selective printing of any measuring point, (b) for printing of any combination of measuring points, or, (c) for continuous monitoring of any measuring point without printing.

Assuming it is desired to print only for measuring point #2, the switch M2 is manually closed. Accordingly, each time the contact 31 of the synchronizing switch S1 engages the contact S1–2, it completes the energizing circuit of input-relay K2 to connect the thermocouple T2 or other #2 point transducer into the measuring circuit; it also completes an energizing circuit for relay R1 via the closed switch M2 and the isolation diode D2: and it also completes an energizing circuit for the #2 point indicator lamp L2. Thus, each time the synchronizing switch is on the #2 point in successive cycles of that switch, the #2 point transducer is connected to the measuring circuit; the speed of the print-drive is made sufficiently slow to provide a suitably long interval for rebalancing of the measuring circuit and positioning of carriage 14 under extremes of initial unbalance; the solenoid P is deenergized to permit printing of the measured value at balance; and the indicator L2 is lighted remotely to identify the point under measurement. For the remainder of each cycle of the synchronizing switch S1, its contact 31 is rapidly moved over points #1 and #3 to #12 so to reduce the cycle time; there is no engagement of print wheel 13 with chart 11 for any of points 1 and 3 to 12; and there is no indication by any of lamps 1, 3 to 12, or equivalent indicating means.

Now assuming it is desired to print for any combination of two or more of the measuring points, the corresponding switches of bank M are manually closed. Accordingly, in each cycle of the synchronizing switch S1, as the moving contact 31 arrives at each of the selected positions, the corresponding input relay of series K1 to K12 is energized, the print-drive speed is reduced, and the hold-out solenoid P is deenergized to permit printing of the corresponding point. For the rest of each cycle, the shaft 32 operates at high speed for rapidly passing over the measuring points either not in use or not of interest for the time being. For example, if it is desired to print for measuring points #1, #2 and #12, the switches M1, M2 and M12 are manually closed. In each ensuing cycle of the recorder, the points 3 to 11 are rapidly passed over without printing because for these points, the relay R1 is in deenergized state so to provide for high-speed rotation of the print-drive shaft 32 by motor 45 and to provide for the print hold-out state of solenoid P. For each of points 1, 2 and 12, however, the relay R1 is in energized state via one of the switches M1, M2, M12 and its associated diodes D1, D2 or D12 so to disable the hold-out solenoid P to permit printing and also to provide, by reduction in speed of print-drive shaft 32, an interval sufficiently long for completion of balancing of the measuring circuit by motor 16. Also, in each ensuing cycle of the recorder, the lamps L1, L2 and L12 are excited as each of the selected points #1, #2 and #12 is in turn connected in circuit for measuring and printing: all other indicators 3 to 11 remain dark.

Now assuming it is desired continuously to monitor any one of the measuring points, the corresponding one of the switches M1 to M12 is closed. Then when the corresponding one of the indicators L1 to L12 is excited, showing that the synchronizing switch S1 is on the desired point, the hold switch H is opened to deenergize both motors 45, 46 and so suspend further advance of the contact 31 of the switch S1. Thus, for example, if point #2 has been selected for continuous monitoring, the contact 31 of synchronizing switch S1 remains continuously in engagement with contact S1–2. In consequence, the input relay K2 remains continuously energized to maintain, via its contacts KC2, the transducer T2 in the measuring circuit so that the position of the recorder carriage 14, under control of the rebalancing motor 16, will continuously follow changes in the measured variable at point #2. The pointer 50 (FIGS. 1, 4B, 9) attached to carriage 14 thus cooperates with the recorder scale 51 (FIG. 4B) continuously to show the magnitude and changes in magnitude of the variable at measuring point #2. If desired, for this mode of operation a continuous record may be obtained by attaching a pen or stylus to the pointer, or if attached swinging it into engagement with the chart. The alarm switches 52H, 52L controlled by cams 53 on the slidewire shaft 17, may also be used to close an alarm circuit if the continuously monitored variable at point #2 reaches a predetermined high or low alarm magnitude.

For this third mode of operation of the recorder system, no printing occurs. Despite the fact that the hold-out solenoid P is deenergized, a state permitting printing for the previously described two operating modes of the recorder, printing does not occur because during continuous monitoring of a selected point there is no rotation of the print-drive shaft.

Figure 2:
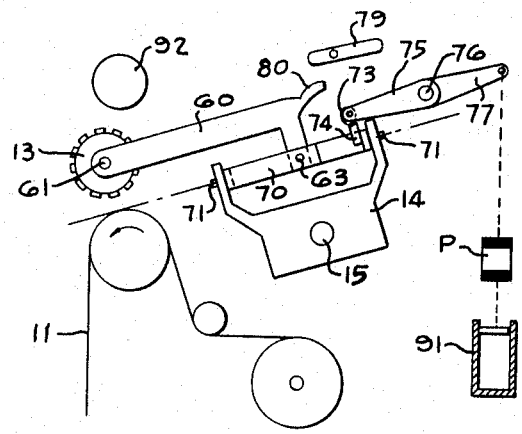
Figure 3:
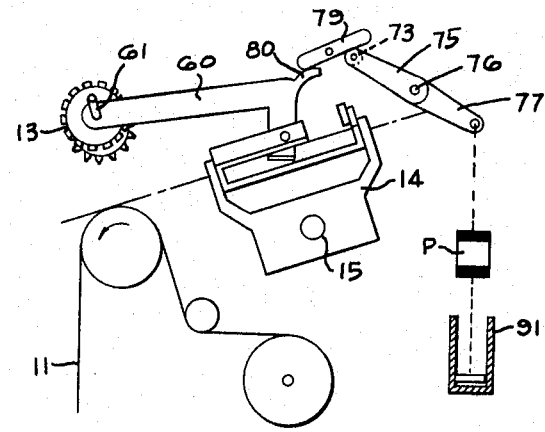

These two features of the third operating mode of the system of FIG. 1 will become more clear from the following discussion. Referring to FIGS. 1 to 3, the print wheel 13 is carried by the print arm 60 with the axis of rotation 61 of the print wheel parallel to the pivotal axis 63 of the arm. For printing, the print wheel is swung bodily about the pivotal axis 63 by the cam 64 from a neutral position defined by the stop 69 as engaged by the scissors arms 68A, 68B. Normally, both arms 68A, 68B engage the shaft 61 of the print wheel 13 and so hold it away from charct 11 (FIG. 1). The print cam 64 is driven from the elongated pinion 36 of the synchronizing switch drive via the gear 65 which is in engagement with pinion 36 for all positions of the recorder carriage 14. Each time a lobe of the print cam 64 engages the arm 66, the print arm 60 is rocked clockwise about its axis 63 to move the print wheel 13 farther away from this chart. This motion tensions the biasing spring 67 (FIG. 1) between scissors arms 68A, 68B. As the lobe of cam 64 rides off arm 66, the stored energy of spring 67 impels the print wheel 13 back to the neutral position for which the upper scissors arm reengages stop 69. However, the print wheel, because of its inertia, overtravels the neutral position for momentary printing contact with chart 11. During this overtravel, the shaft 61 of the print wheel moves the lower scissors arm 68B downwardly from engagement with stop 69 to store energy in biasing spring 67 so to insure return of the print arm 60 and parts mounted thereon to neutral position after printing.

For the third mode of operation of the recorder system, i.e., continuous monitoring of a selected measuring point, the drive pinion 36 is stationary. Consequently, the print cam 64 is also stationary and the print wheel 13 together with print arm 60 remains in the neutral non-printing position regardless of the state of the print hold-out solenoid P. In short, printing is prevented during the continuous monitoring of a single point by stopping the print drive.

For preventing the printing of a non-selected point or of the non-selected points during the first or second operating mode for which the drive pinion 36 is in continuous rotation, the hold-out solenoid P is energized as above described in discussion of the circuitry of FIG. 1. There is now described the recorder mechanism associated with solenoid P for permitting printing of the selected point or points and preventing printing of the non-selected point or points.

With the solenoid P deenergized, the tilt-bar 73 is biased by its spring 78 away from engagement with the hold-out pawl 79 and the print wheel 13 has its normal spacing from chart 11 (FIG. 2). Consequently, when the printing arm 60 is actuated by the print cam 64, as above described, it will engage the chart 11 to print a selected measuring point. When the solenoid P is energized (FIG. 3), the tilt-bar 73 engages and moves the hold-out pawl 79 to engage the extension 80 of the print arm 60 and tilt the print wheel 13 about axis 63 to a position remote from the chart 11 so to preclude printing engagement between the print wheel 13 and the chart. Thus, none of the non-selected measuring points is printed despite continuous operation of the printing drive.

Figure 4A:
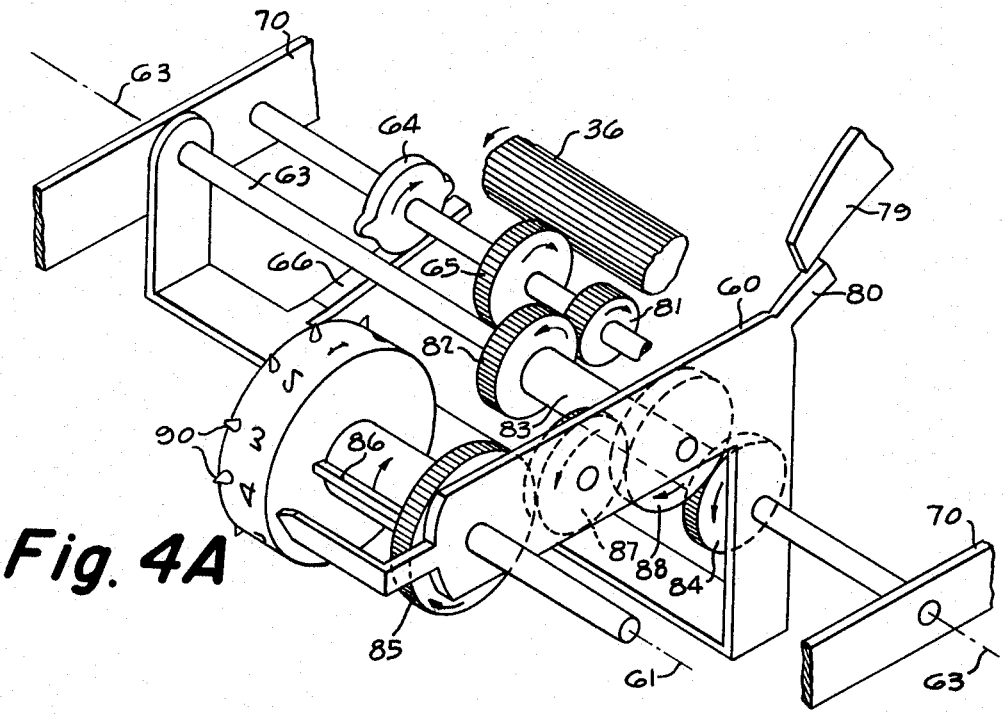
FIG. 4A is a perspective view on enlarged scale of the print-wheel carriage with a drive for advancing the print wheel for printing of different points.
Figure 4B:
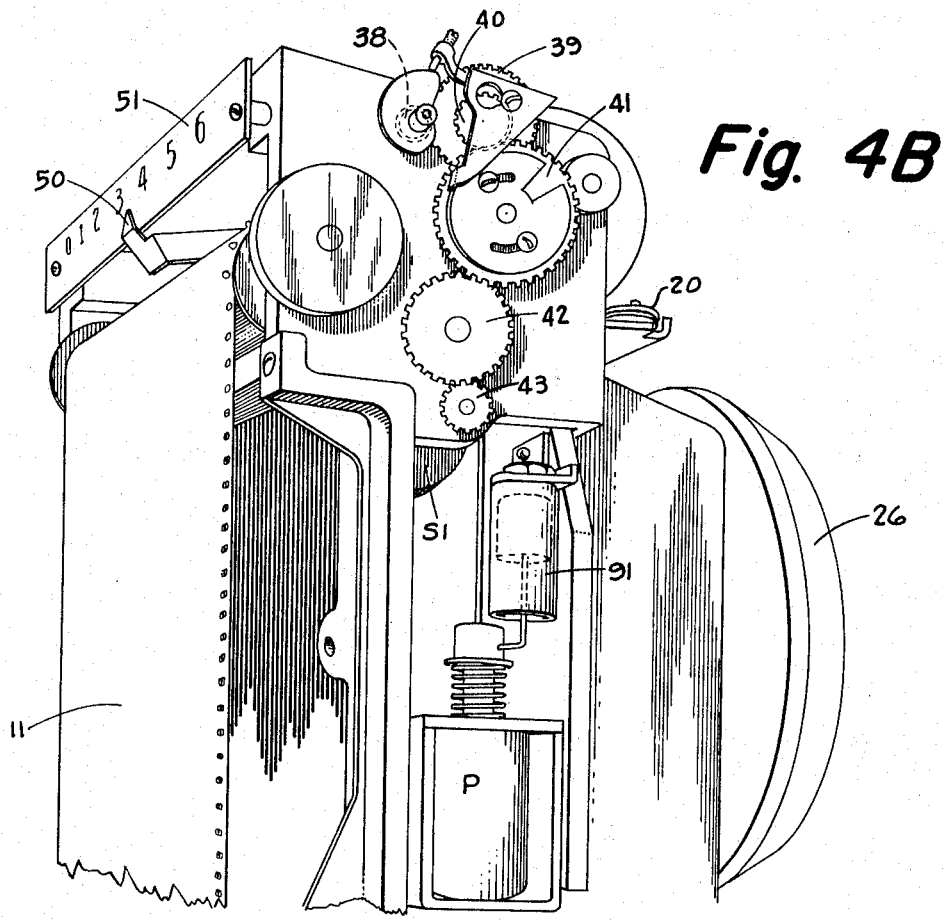
FIG. 4B is a perspective view of the recorder mechanism showing, inter alia, the print hold-out solenoid, print control cams, the synchronizing switch and its drive and the monitoring indicator.

As best shown in FIG. 4A, the peripheral face of the print wheel 13 is provided with a set of equally angularly-spaced point identification markers such as the printing numerals #1 to #12. These identification markers are, in turn, presented to the chart 11 in correspondence with the position of the movable contact 31 of the synchronizing switch S1 for all of three modes of recorder operation above described. Such synchronized angular positioning of the print wheel 13 about its axis of rotation 61 is derived from the pinion 36 which, as above stated, is in continuous mesh with gear 65. Specifically, the gear 65 is coupled to or integral with gear 81 which drives gear 82 on the sleeve 83 which is free to rotate on shaft 63. The gear 84 also attached to sleeve 83 thus rotates about the pivot or axis 63 of the print arm 60. The gear 85 coupled, as by key 86, to the print wheel 13 is driven from gear 84 by the gears 87, 88 rotatably carried by the print arm 60.

If desired, the print wheel 13, as shown in FIG. 4A, may have a second set of markers 90 for printing dots. Selectively to provide either of two types of printing, i.e., either a dot or a dot plus a point-identification character, provision is made, as more fully described in aforesaid application Serial No. 277,995, for changing the angular relation between the axis of rotation 61 of the print wheel 13 and the chart 11. Briefly, for this option, the axis 63 of the print arm 60 is supported on recorder carriage 14 through the intermediary of the yoke or frame 70 for pivotal movement about a tilt axis 71 which is at right angles to the printing axis 63. Thus, for an angular position of the tilt-bar 73 intermediate the positions shown in FIGS. 2 and 3, the axis 61 of the print wheel 13 is inclined to present only the dot markers for engagement with the chart. Such changing of the angular position of the tilt-bar 73 involves the cams and cam-followers shown in FIG. 4B.

Whether or not such printing option is provided, the solenoid P for print hold-out actuation of the tilt-bar is preferably provided with dash-pot 91 (FIGS. 2, 3, 4A) for cushioning the jar otherwise imposed on the recorder mechanism. It may here also be noted that the print wheel 13 may be of micro-reticulated plastic material containing within its own structure a supply of ink sufficient for 50,000 impressions per marker. Further to extend the inking life of such porous wheel, an auxiliary ink-impregnated porous roll or pad 92 (FIG. 2) may be provided for transfer of ink to wheel 13 each time it is kicked upwardly by a lobe of print cam 64.

The recorder system shown in FIG. 5 affords the same three modes of operation as FIG. 1: i.e., (a) printing of any selected measuring point; (b) printing of any selected combination of two or more measuring points; or (c) continuous monitoring of any selected measuring point without printing. Similar components of these two systems are identified by the same reference characters, and for brevity the discussion of FIG. 5 is principally concerned with differences in composition.

As shown in FIG. 5, a single high-speed motor 45 is used to drive the shaft 32 of the print mechanism, and its ON-OFF operation is jointly controlled (FIGS. 5, 6) by the contacts KR5, KR6, KR7 of the relay R1, the cam-operated switch S2 of a timer-motor 95 and the cam-operated switch S3 of the print motor 45.

For printing of one selected measuring point, the hold switch H is in closed-circuit position and the switch of bank M, corresponding with the desired point, is closed. Assuming, for example, that printing of point 12 is desired, the switch M12 is manually closed. In each subsequent cycle of the synchronizing switch S1, its contact 31 is rapidly moved over the fixed contacts S1–1 to S1–11 by the motor 45 as continuously energized through the normally-closed contacts KR5 of relay R1. When, however, the contact 31 of switch S1 reaches contact S1–12, the relay R1 is energized from current source 27 through the closed selector switch M12 and the associated isolation diode D12. With the relay R1 energized, its contact KR7 is closed (time $t_0$ of FIG. 7) to initiate a cycle of the timing motor 95 (curve A). At the same time, the contacts KR5 of relay R1 open, but the print motor 45 continues to run because supplied with current through two circuits, one including the switch S3 in series with the now closed contact KR6 of relay R1, and the other including the timer switch S2 in series with the hold switch H. At time $t_1$ in the timer cycle, the timer switch S2 opens (curve C of FIG. 7) to interrupt one of these circuits. However, the other energization circuit remains closed and the print motor 45 continues to run until time $t_2$ in the timer cycle at which time the switch S3 opens to stop the print motor 45. The print motor remains deenergized until at time $t_3$ of the timer cycle the timer switch S2 re-closes (curve C) to energize the motor (curve B) through the closed hold switch H. The time interval $t_3 - t_2$ is sufficiently long for the completion of rebalancing of the measuring circuit by the motor 16 so that the recorder carriage 14 is at rest before time $t_3$. With the print motor 45 re-energized at $t_3$, the printing of the measured point occurs shortly before time $t_4$, at which time the contact 31 of the synchronizing switch S1 moves off the selected contact point which in the example under discussion is contact S12. The relay R1 is thereupon deenergized to complete the timing cycle (curve A).

Throughout the interval $t_0$ to $t_4$, the hold-out solenoid P is deenergized because of the open-circuit state of the normally-closed contacts KR2 of relay R1. Accordingly, printing of the measured point is permitted.

At time $t_3$, the printing motor 45 is energized and continues to run rapidly to move contact 31 of the synchronizing switch S1 through the successive positions #1 to #11 without printing until the selected point #12 is again reached whereupon the timing cycle of FIG. 7 is repeated for the next printing of point 12. To avoid energization of motor 16 as the contact 31 sweeps over the non-selected point contacts in the series S1–1 to S1–11, the relay R1 is provided with the normally-open contact KR8 which interrupts the circuit of the control winding 22 of the rebalancing motor 16 except when the synchronized switch S1 is on the point selected for measurement.

For printing of a selected group of points, the hold switch H is in closed-circuit position and the switches of bank M corresponding with the desired points are closed. Assuming for example, that printing of points #1, #3, #6, #10 and #11 is desired, the cycle of FIG. 7 occurs each time the contact 31 of the synchronizing switch S1 passes onto contacts S1–1, S1–3, S1–6, S1–10 and S1–11. At time $t_3$, of each of these cycles, the print motor 45 starts to run again and continues to run without interruption until a time $t_2$ in the next cycle as initiated by engagement of contact 31 of synchronizing switch S1 with the next point selected for measurement. Specifically, in the group example under discussion, the motor 45 runs continuously from time $t_3$ of the first printing cycle corresponding with contact point S1–1 to the time $t_2$ of the second printing cycle corresponding with contact point S1–3; continuously from time $t_3$ of the second printing cycle to time $t_2$ of the third printing cycle corresponding with point S1–6; continuously from time $t_3$ of the third printing cycle to time $t_2$ of the fourth printing cycle corresponding with point S1–10. Since the selected points S1–10 and S1–11 are immediately adjacent, the total time interval during which the printing-drive is then operative is equal to the sum of the interval $t_3$ to $t_4$ of the fourth cycle and the interval $t_0$ to $t_2$ of the fifth cycle. This sum $(t_2-t_0)+(t_4-t_3)$ is the minimum On-time T of the motor 45.

Thus for the particular example chosen, the time required for a complete cycle of the recorder is of duration $5(t_3-t_2)+12T$. Correspondingly, if only two points are selected for printing, the recorder cycle duration is $2(t_3-t_2)+12T$; for eight points is $8(t_3-t_2)+12T$, and so on. In general, the recorder cycle duration for the two described modes of operation of FIG. 5 is $$n(t_3-t_2)12T$$

where $n$ is the number of points to be measured and printed.

For the third mode of operation of the recorder system of FIG. 5 (i.e., continuous monitoring, without printing, of any selected point), it is only necessary to open the switch H and to close that one of the M switches which corresponds with the desired point. When in subsequent operation of the recorder the contact 31 of the synchronizing switch S1 first reaches the fixed S1 contact corresponding with the desired point, the cycle of FIG. 7 is initiated as previously described, but is not completed because after switch S3 is opened at time $t_2$ to stop the print motor 45, there is no re-starting circuit for it, the switch H being open. Accordingly, the contact 31 of the switch S1 remains stationary with the selected transducer in the measuring circuit for response of motor 16 to any change in magnitude of the measured variable at the selected point with consequent change in position of the scale pointer 50.

The recorder system shown in FIG. 8 provides the three modes of operation discussed in connection with the systems of FIGS. 1 and 5, and additionally provides two other modes of operation, namely: printing or non-printing during the monitoring of any point or of any combination of points connected in parallel in the measuring circuit. Except in respects discussed below, the system of FIG. 8 is similar to that of FIG. 5 and corresponding elements are identified by the same reference characters.

The circuitry for controlling the print motor 45 is similar to FIGS. 5 and 6 except that switch S3 is operated via relay R3 instead of directly by the print motor cam 55 and that the hold-switch H is operated via relay R2. The energization of both relays R2, R3 is controlled, as later described, by the two-blade, three-position manually-operable Function switch F.

It is also to be noted that in FIG. 8 (unlike FIGS. 1 and 5) the conductors from the lower terminals of input relays K1–K12 are not connected to the corresponding contact of the synchronizing switch S1 but to the lower terminal of the corresponding M switch. Thus, the input relay K1, for example, is not energized from source 27 when the contact 31 of the synchronizing switch S1 is on the S1–1 point unless the switch M1 has been closed by the operator: the same is true for each of the other input relays.

For the indicated poling of current source 27, its positive terminal is connected via conductor 100 to contacts FC1, FC3 and FC5 of the Function-switch F. The negative terminal of source 27 is connected via conductor 101 to the lower terminal of relay R2 and via the cam-operated print switch S3' to the lower terminal of relay R3. The other terminal of relay R3 is connected via conductor 102A to contact FC4 of the Function-switch F. With the auxiliary Function-switch F1 closed (or bridged and omitted), the contact FC2 of Function-switch F is connected via conductor 102B to the contacts S1–1—S1–12 of the synchronizing switch S1 each through a corresponding one of the isolation diodes 1D–12D. It is to be noted that these diodes are so poled that current cannot flow from the +terminal of source 27 directly to conductor 102B through the synchronizing switch S1.

*Function-switch F in #1 position*

With the Function-switch F in its #1 position, its contact 103 bridges the contacts FC3, FC4. This completes an energizing circuit for the print motor relay R3 which can be traced from the +terminal of source 27 through conductor 100, contacts FC3, 103, FC4 of Function-switch F, conductor 102A, the coil of relay R3, the print-cam switch S3', and through conductor 101 to the negative terminal of source 27.

Now assuming that a single one of the M switches, for example M5, is closed, the contact S1 is advanced until it reaches the corresponding one of the S1–1 to S1–12 switches, specifically S1–5. Such advance is by continuous operation of print motor 45 whose energization circuit is then completed through the normally-closed contacts KR5 of the now deenergized relay R1. When contact 31 arrives on contact S1–5, the input relay K5 for transducer T5 is energized from source 27 via contacts 31, S1–5 of the synchronizing switch S1 and the closed M switch (M5); the indicator lamp L5 is lighted from source 27 via contacts 31, S1–5 of the synchronizing switch S1 and switch M5; and the relay R1 is energized from source 27 via contacts 31, S1–5 of the synchronizing switch S1, switch M5, and the isolation diode D5.

With relay R1 energized, the printing cycle of FIG. 7 is initiated, as discussed in connection with FIG. 5, with control of print motor energization transferred from the now-open contact KR5 of relay R1 to the now-closed contact KR6 of relay R1 and the closed contacts S3 of the print-cam controlled relay R3. The print motor 45 continues to run until time $t_2$ when print cam 55 opens switch S3' and so effects deenergization of relay R3. At the end of the interval $t_3-t_2$ afforded for rebalancing of the measuring circuit by motor 16, the cam switch S2 of the timer 95 re-starts the print motor 45 through the energization circuit afforded by the now-closed switch S2 and the normally-closed contacts H of relay R2. Before time $t_4$ of the printing cycle, printing of the measured point #5 is accomplished because the hold-out print solenoid P is in deenergized state due to open-circuit position of contacts KR2 of relay R1.

At time $t_4$, the contact 31 of the synchronizing switch rides off contact S1-5 so deenergizing the control relay R1, input relay K5, and the indicator lamp L5. Energization of the print motor 45 is continued after deenergization of relay 5 via the normally-closed contacts KR5 of that relay. In consequence, the contact 31 of the synchronizing switch S1 rapidly moves over the contacts S1-6 to S1-12, S1-1 to S1-4 without any printing because of continuous energization of the hold-out solenoid P via the normally-closed contact KR2 of relay R1.

In short, with Function-switch F in its #1 position and one of switches M1 to M12 closed, the single selected measuring point is printed in each complete recorder cycle and the print motor 45 continuously operates at high speed except for rebalancing interval $t_3-t_2$ of a single timing cycle such as shown in FIG. 7. If for the same position of switch F any combination of the switches M1 to M12 is closed, each of the selected measuring points is in turn printed in each ensuing recorder cycle during a corresponding timing cycle, as above described, while the contact 31 is temporarily at rest and the print motor 45 is re-started in each timing cycle rapidly to advance the contact 31 of the synchronizing switch S1 to the next selected contact of the series S1-1 to S1-12.

For the aforesaid #1 position of Function-switch F, it is immaterial whether the auxiliary Function-switch F1 is open or closed.

*Function-switch F in #2 position*

With the Function-switch F in its #2 position, its blade or slide contact 103 bridges the contacts FC4, FC5 and its blade or slide contact 104 bridges the contacts FC1, FC2. In this case, an energizing circuit for the print-motor relay R3 can be traced from the positive terminal of current source 27 through conductor 100, contacts FC5, 103, FC4 of the Function-switch F, conductor 102A, relay coil R3, print-cam switch S3' and conductor 101 back to the negative terminal of source 27. In this case, the hold relay R2 is also energized from source 27 through a circuit which can be traced from the positive terminal of source 27 through conductor 100, contacts FC1, 104, FC2 of Function-switch F, conductor 102B, the coil of relay R2, and conductor 101 back to the negative terminal of source 27. The lamp LH is in shunt to relay coil R2 and so is energized concurrently therewith for indicating purposes.

Thus, if any one of the switches M is closed, for example M5, the input relay K5 is energized to connect transducer T5 in the measuring circuit, as above described, and the relay R1 is energized to initiate a print motor cycle (FIG. 7.) However, since relay R2 is energized, the print motor 45 is not re-started for completion of the cycle via timer switch S2. In consequence, the value of the measured point (#5) is not printed, though indicated by pointer 50 and contact 31 of the synchronizing switch remains on point S1-5 during continued operation of recorder 10 for continuous monitoring of the #5 point without printing. Such single-point monitoring occurs with the auxiliary Function-switch F1 in either its open or closed-circuit position.

There are now described additional two types of operation provided by the system of FIG. 8 with Function-switch F in its #2 position and auxiliary Function-switch F1 in one or the other of its two positions.

It is first assumed that auxiliary switch F1 is in closed-circuit position and that any desired combination of the M switches, for example M5, M9 and M12, have been closed. With these switches closed, the input relays K5, K9, K12 are energized regardless of the position of contact 31 of the synchronizing switch. Their energization circuits may be traced from the positive terminal of source 27 through conductor 100, contacts FC1, 104, FC2 of the Function-switch F, conductor 102B, auxiliary Function-switch F1, conductor 102C to the isolation diodes 5D, 9D, 12D. Here the diode 5D provides a path through closed selector switch M5 and the coil of relay K5 to the negative terminal of source 27; the diode 9D provides a path through closed selector switch M9 and the coil of relay K9 to the negative terminal of source 27; and the diode 12D provides a path through closed selector switch M12 and the coil of relay K12 to the negative terminal of source 27. With relays K5, K9, K12 energized, the transducers T5, T9, T12 in parallel are connected to the measuring circuit.

With the function switches in the positions assumed, the relays R1 and R2 are energized via circuits previously traced. The closure of contacts KR8 of relay R1 effects energization of the control winding of the rebalancing motor 16 so that the recorder carriage 14 is positioned to represent the parallel output of transducers T5, T9, T12. The closure of contacts KR5, KR6, KR7 initiates a timing cycle such as shown in FIG. 7. However, the timing cycle is not completed because with relay R2 energized to hold switch H open, the print motor 45 is not re-started by closure of the timer switch S2 after it has been stopped by opening of the print switch S3 and the recorder continues to monitor, without printing the parallel output of the selected group of transducers T5, T9, T12.

It is now assumed that the auxiliary Function-switch F1 is open, the Function-switch F is in its #2 position, and that the desired combination of M switches is again M5, M9, M12. With switch F1 open, the input relays K1, K5, K12 are not energized via the diodes 5D, 9D, 12D. When contact 31 of synchronizing switch S1 first reaches a position of engagement with any one of the selected contacts S1-5, S1-9, S1-12, the recorder will continuously monitor, without printing, the measured variable at that corresponding single point under control of relays R1, R2, R3 as previously described.

Thus with Function-switch F alternated between its #1 and #2 positions, the auxiliary Function-switch F1 being opened and closed, the relationship between the parallel output of any combination of the transducers T1-T12 with respect to the output of any one transducer of the selected combination may be ascertained.

*Function-switch F in #3 position*

With the Function-switch F in its #3 position, its slide contact 103 engages only contact FC5 and so prevents completion of the energization circuit for the print motor relay R3; its slide contact 104 engages contact FC2, FC3 to complete an energization circuit for the hold relay R2 and hold-indicator LH. For this position of the Function-switch F, the print motor 45 is continuously energized whether or not relay R1 is energized through the synchronizing switch S1 and any one or more of the selector switches M. When the relay R1 is deenergized, the motor-energization circuit is completed through the normally-closed contacts KR5 of relay R1: when relay R1 is energized, the motor-energization circuit is completed via contacts KR6 of relay R1 and the normally-closed contacts S3 of relay R3. Relay R3 remains deenergized so long as the Function-switch F is in the #3 position. With the relay R2 continuously energized for the #3 position of switch F, the hold switch H is held open so that the timer motor 95 is not energized.

With the Function-switch F in its #3 position, the auxiliary switch F1 is used only in the closed-circuit position: to insure this, the switches F, F1 may be mechanically interlocked.

In operation of the recorder with Function-switch F in the #3 position and switch F1 closed, if any one of the M switches is closed, the corresponding input relay of the series K1–K12 is immediately energized.

When more than one M switch is closed in any desired combination, the corresponding groups of input relays and indicators are immediately energized and remain energized. In consequence, the recorder 10 prints out the parallel output of the selected combination of transducers.

It shall be understood the invention is not limited to the particular systems specifically illustrated and described but also comprehends equivalents and modifications thereof within the scope of the appended claims.

What is claimed is:

1. A multi-point recorder system comprising
    a recorder carriage movable transversely of a recorder chart to position corresponding with balance of a measuring circuit,
    a multi-point printer mounted on said carriage for movement into printing engagement with the chart,
    a multi-point switch having movable contact structure in sequence engageable with contacts respectively corresponding with different measuring points connectable to said measuring circuit,
    drive means continuously mechanically connected to said multi-point printer and to said multi-point switch for advancing said movable contact structure of the multi-point switch in synchronism with advance of markers of the multi-point printer and including actuating means operable to effect printing movement of said multi-point printer,
    print-hold-out means including a solenoid normally in energization state precluding printing movement of said printer by said actuating means,
    control relay means having contacts in the energization circuit of said solenoid, and
    a plurality of point-selector switches in the energization circuit of said relay means and respectively in series with said contacts of the multi-point switch to effect, when any one or any combination of the point-selector switches is closed, a change in the energization state of said solenoid for printing of only the selected measuring point or points.

2. A multi-point recorder system as in claim 1 in which said carriage is provided with an indicator and in which the system additionally includes
    a hold-switch operable to deenergize said drive means so to provide for continuous monitoring by precluding advance of said movable contact structure of the multi-point switch beyond a contact position for which said switch and a closed point selector switch effects energization of said relay means.

3. A multi-point recorder system as in claim 1 additionally comprising
    drive-control means including additional contacts of said relay means for effecting operation of said drive means at high speed during its drive of the multi-point switch through positions corresponding with non-selected measuring points.

4. A multi-point recorder system as in claim 1 in which said drive means includes high-speed and low-speed means,
    and in which said relay means has additional contacts and connections for effecting advance of said movable contact structure of the multi-point switch at low-speed while on a contact corresponding with a selected measuring point and at high speed for movement over contacts corresponding with non-selected measuring points.

5. A multi-point recorder system as in claim 1 additionally including
    a plurality of input relays respectively connected to corresponding point contacts of said multi-point switch and each having contacts for respectively including a corresponding transducer in said measuring circuit, and
    a plurality of diodes respectively in circuit between said control relay means and said point-selector switches to preclude interaction between said input relays and said control relay during operation of said multi-point switch.

6. A multi-point recorder system as in claim 1 additionally including
    a plurality of input relays having contacts for respectively including a corresponding transducer in said measuring circuit and connected to corresponding selector switches for energization of any input relay or selected group of input relays independently of the position of said multi-point switch.

7. A multi-point recorder system as in claim 1 additionally including
    a plurality of input relays having contacts for respectively including a corresponding transducer in said measuring circuit and each having an energizing circuit including the corresponding point-selector switch and the corresponding point contact of the multi-point switch, and
    a function switch having contacts which for at least one position of the function switch provide independently of said multi-point switch a second energizing circuit for all input relays whose associated point-selector switches are on selected point contacts of the multi-point switch.

8. A multi-point recorder system as in claim 1 in which said drive means comprises
    a low-speed drive including a continuously energized motor coupled by an overrunning clutch to said movable contact structure of the multi-point switch,
    a high-speed drive including a motor coupled by an overrunning clutch to said movable contact structure of the multi-point switch, and
    means including normally-closed contacts of said relay means for effecting energization of the high-speed drive motor when said movable contact structure is not on a selected measuring point.

9. A multi-point recorder system as in claim 8
    in which the carriage is provided with an indicator, and
    in which the system additionally includes a hold-switch operable to deenergize both motors so as to provide continuous monitoring by preventing advance of said movable contact structure of the multi-point switch from a contact position for which it and a closed point-selector switch effects energization of said relay means.

10. A multi-point recorder system as in claim 1
    in which said drive means includes a print motor continuously coupled to said multi-point switch and a first cam-operated switch, and
    control means for said print motor comprising
        a timer motor coupled to a second cam-operated switch,
        said control relay means having normally-closed contacts for maintaining energization of said print motor when said multi-point switch is not on a selected point,
        a first set of normally-open contacts effective upon energization of said relay means to maintain continued energization of said print motor until said first cam-operated switch is operated, thereby to effect deenergization of said print motor, and
        a second set of normally-open contacts for effecting energization of said timer motor upon energization of said relay means to initiate a timing cycle during which said print motor is stopped under control of said first cam-operated switch, said print-motor normally restarting in said cycle under control of said second cam-operated switch.

11. A multi-point recorder system as in claim 10 in which the carriage is provided with an indicator, and in which the control means for said print motor additionally includes a hold-switch in circuit with said second cam-operated switch to provide, when said hold-switch is closed for ON-OFF-ON operation of said print motor under control of said control means in successive timing cycles each occurring when the synchronizing switch is in position corresponding with any one or more selected measuring points and to provide, when said hold-switch is open, for continuous monitoring with said synchronizing switch left stationary in position corresponding with one selected measuring point.

12. A multi-point recorder system as in claim 10 in which said first cam-operated switch is mechanically coupled to said print motor and is in series with said first normally open contacts of said control relay means, said second cam-operated switch is electrically in parallel with the series combination of said first cam-operated switch and said first set of normally open contacts to provide dual energization circuits for said print motor until said first cam-operated switch is opened and then to retain energization of said print motor through said second cam-operated switch until it is operated.

13. A multi-point recorder system as in claim 12 additionally including a series connected hold switch in said energization circuit through said second cam-operated switch to preclude restarting of said print motor in said timing cycle to afford continuous monitoring when said synchronizing switch is in position corresponding with any selected measuring point.

14. A multi-point recorder system of the type which includes a multi-point print wheel mechanically connected to a synchronizing switch having a plurality of stationary contacts and a bridging contact and motor-drive means therefor and wherein the effective speed of the motor-drive means is dependent upon the number of points to be recorded, characterized by the ease with which points to be recorded may be selected, in which said synchronizing switch includes in series with each of said stationary contacts thereof, corresponding to a point to be recorded, a readily accessible manually settable point-selector switch for controlling the state of energization of the operating coil of relay means which in one state permits the production of a record by said print wheel and in its other state prevents production of a record by said print wheel, means concurrently operated by said relay means upon closure of said bridging contact with each of said stationary contacts of said synchronizing switch, for which said manually settable point-selector switch has been set, to effect a resultant slow-down of said motor-drive means to allow time for a complete balancing operation of the measuring circuit of said recorder and printing of a record by said print wheel, and an input-selector relay for each point to be recorded, each said input-selector relay having its energizing circuit completed through a corresponding one of said stationary contacts of said synchronizing switch with closure of the contacts of each of said input-selector relays effecting connection of a transducer to the measuring circuit of said multi-point recorder.

15. A multi-point recorder system comprising a plurality of point-selector switches respectively corresponding to measuring points of the system, a multi-point switch having point contacts respectively connected to said point-selector switches and in sequence engagable with a scanning contact, motor-drive means for advancing said scanning contact relative to said point contacts, and control circuitry for said motor-drive means including relay means connected for energization via said multi-point switch and any desired group of one or more point-selector switches and having contacts which control said motor-drive means to provide a fixed time interval of contact between each selected measuring point and its respective point contact and high-speed advance over the non-selected points.

16. A multi-point recorder system as in claim 15 in which the motor-drive means includes high-speed and low-speed motors respectively coupled via over-runing clutches to said scanning contact of the multi-point switch, and in which contacts of the relay means are effective during energization of the relay means to stop the high-speed motor during continued running of the slow-speed motor.

17. A multi-point recorder system as in claim 15 in which the motor-drive means comprises a high-speed motor continuously coupled to the scanning contact of the multi-point switch, in which said relay means has sets of normally-open contacts and a set of normally-closed contacts, and which additionally includes a timer-motor, cam-operated switches respectively operated by said motors, an energization circuit for said timer-motor controlled by one set of normally-open contacts of said relay means, a first energization circuit for said high-speed drive motor controlled by said normally-closed contacts of the relay means for high-speed advance of the scanning contact over non-selected point contacts, a second energization circuit for said high-speed drive motor controlled by another set of normally-open contacts of said relay means and by the cam-operated switch of that motor to stop it and so to start one of said fixed time intervals, and a third energization circuit for said high-speed drive motor controlled by the cam-operated switch of the timer motor to re-start the drive motor in completion of said fixed time interval.

18. A multi-point recorder system as in claim 15 which additionally includes a multi-point printing element advanced by said motor-drive means in synchronism with said scanning contact of the multi-point switch and movable via said motor-drive means for printing engagement with a recorder chart, print-hold-out means including a solenoid normally in energization state preventing printing by said printing element, and contacts in the energization circuit of said solenoid and controlled by said relay means to permit printing movement of said printing element only if said scanning contact is on a selected point contact of the multi-point switch.

19. A multi-point recorder system as in claim 15 in which said control circuitry for the motor-drive means additionally includes a hold-switch operable to preclude advance of the scanning contact from a selected point contact of the multi-point switch.

20. A multi-point recorder as in claim 16 additionally including a hold-switch operable to deenergize both of said motors for continuous monitoring of a selected measuring point.

21. A multi-point recorder as in claim 17 additionally including a hold-switch in said energization circuit of the timer-motor for continuous monitoring of a selected measuring point.

22. A multi-point recorder as in claim 17 additionally including a multi-point printing element advanced by said motor-drive means in synchronism with said scanning contact of the multi-point switch and movable via said motor-drive means for printing engagement with a recorder chart, and circuit means operable to effect bypassing of said multi-point switch for continuous monitoring and printing of any selected point or combination of points.

References Cited by the Examiner
UNITED STATES PATENTS

| | | | |
|---|---|---|---|
| 2,549,401 | 4/1951 | Stein et al. | 346—34 X |
| 2,628,149 | 2/1953 | Blakeslee | 346—34 X |
| 3,034,125 | 5/1962 | Gonzenbach | 346—34 X |
| 3,139,319 | 6/1964 | Mellon | 346—34 |
| 3,189,910 | 6/1965 | Blakeslee | 346—34 X |
| 3,195,141 | 7/1965 | Brown et al. | 346—34 X |

RICHARD B. WILKINSON, *Primary Examiner.*

J. G. MURRAY, J. W. HARTARY, *Assistant Examiner.*

UNITED STATES PATENT OFFICE
CERTIFICATE OF CORRECTION

Patent No. 3,316,554                                   April 25, 1967

Kenneth B. Parker, Jr., et al.

It is hereby certified that error appears in the above numbered patent requiring correction and that the said Letters Patent should read as corrected below.

Column 5, line 7, for "charct" read -- chart --; column 6, line 56, for "selector" read -- selected --; column 7, line 54, for "8(t,-t.)+12T" read -- $8(t_3-t_2)+12T$ --; line 57, the equation should appear as shown below instead of as in the patent:

$$n(t_3-t_2) +12T$$

column 13, line 13, for "closed" read -- closed, --.

Signed and sealed this 24th day of September 1968.

(SEAL)
Attest:

EDWARD M. FLETCHER, JR.                            EDWARD J. BRENNER
Attesting Officer                                    Commissioner of Patents